(12) United States Patent
Kazlauskas et al.

(10) Patent No.: US 12,047,496 B1
(45) Date of Patent: Jul. 23, 2024

(54) NONCUSTODIAL TECHNIQUES FOR GRANULAR ENCRYPTION AND DECRYPTION

(71) Applicant: Corsali, Inc., San Francisco, CA (US)

(72) Inventors: Anna Kazlauskas, San Francisco, CA (US); Zachary Donald Hay, San Francisco, CA (US); Kahtaf Alam, Toronto (CA); Daniel Rasmuson, Austin, TX (US)

(73) Assignee: CORSALI, INC., San Francisco, CA (US)

( * ) Notice: Subject to any disclaimer, the term of this patent is extended or adjusted under 35 U.S.C. 154(b) by 0 days.

(21) Appl. No.: 18/101,010

(22) Filed: Jan. 24, 2023

(51) Int. Cl.
*H04L 29/06* (2006.01)
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/3247* (2013.01)

(58) Field of Classification Search
CPC ... H04L 9/0825; H04L 9/0861; H04L 9/3247; H04L 9/3249; H04L 9/0866; H04L 9/3252; H04L 9/3228; H04L 9/3234; H04L 2012/6451; H04L 9/28; H04L 9/30; H04L 12/40104; H04L 29/06659; H04L 26/06666; H04L 29/06673; H04L 29/0668; H04L 29/06687; H04L 63/0435; H04L 63/0442; H04L 63/0471; H04L 2463/062; G05B 2219/25235; G05B 2219/25423; G05B 2219/50197; G05B 2219/31192; G07B 2017/00766; H04M 2215/0156; H04N 2201/3233; H04N 13/0066; H04N 2201/3229; H04N 1/4486; H04N 2201/3281; G06F 2212/178;
(Continued)

(56) References Cited

U.S. PATENT DOCUMENTS 8,819,841 B2 8/2014 Parks et al.
10,630,682 B1 4/2020 Bhattacharyya et al.
(Continued)

OTHER PUBLICATIONS

Add Wallet Onboard to Your App, Available Online at: https://plaid.com/docs/wallet-onboard/add-to-app/, Accessed from Internet on Dec. 22, 2022, 1 page.
(Continued)

*Primary Examiner* — Wasika Nipa
*Assistant Examiner* — Leynna Truvan
(74) *Attorney, Agent, or Firm* — Kilpatrick Townsend & Stockton LLP

(57) ABSTRACT

Noncustodial techniques for granular encryption and decryption are provided. One example method can include receiving a selection of a data object for encryption from a plurality of data objects in a data package via a user interface; receiving a message from a remote server; generating an encryption key for the data object using the message; encrypting the data object with the encryption key to create an encrypted data object; storing the at least one portion of the message associated with the encrypted data object in a metadata file; encrypting the metadata file using a user encryption key to create an encrypted metadata file; and transmitting the encrypted data object and the encrypted metadata file to a database for storage.

11 Claims, 10 Drawing Sheets

(58) Field of Classification Search
CPC ..... G06F 2221/0711; G06F 2221/2153; G06F
11/1435; G06F 11/3086; G06F 16/14;
G06F 16/38; G06F 16/383; G06F 16/48;
G06F 16/583; G06F 16/68; G06F 16/683;
G06F 16/783; G06F 16/908; G06F
17/301; G06F 17/30997; G06F 2211/104;
G06F 2212/466; G06F 2212/7207; G06F
2221/2107; G06F 7/1016; G11B
20/00811; G11B 20/0021; G11B
20/00217; G06K 2209/27; G06Q
20/40975; G10H 2240/026; H04H 60/23;
H04Q 2213/13339; H04Q 2213/339;
H04W 12/001; H04W 12/03
See application file for complete search history.

(56) References Cited

U.S. PATENT DOCUMENTS

| | | | | |
|---|---|---|---|---|
| 11,436,588 | B1* | 9/2022 | Roth | G06Q 30/0185 |
| 11,831,407 | B1 | 11/2023 | Kazlauskas et al. | |
| 2009/0282254 | A1 | 11/2009 | Wheller et al. | |
| 2012/0066490 | A1 | 3/2012 | Sato et al. | |
| 2013/0191647 | A1 | 7/2013 | Ferrara et al. | |
| 2015/0088754 | A1 | 3/2015 | Kirsch | |
| 2016/0012465 | A1* | 1/2016 | Sharp | G06Q 20/321 |
| | | | | 705/14.17 |
| 2017/0244713 | A1* | 8/2017 | Sun | G06F 21/125 |
| 2022/0150188 | A1* | 5/2022 | Cotner | H04L 63/04 |

OTHER PUBLICATIONS

Authentication Using JWT, Hasura Inc., Available Online at: https://hasura.io/docs/latest/auth/authentication/jwt/, 2022, 20 pages.
Bring Your Own JWT Providers, Available Online at: https://web3auth.io/docs/custom-authentication/byo-jwt-providers, Accessed from Internet on Dec. 22, 2022, 9 pages.
Can I Use Web3Auth Without the Modal?, Available Online at: https://github.com/Web3Auth/web3auth-web/discussions/337, Accessed from Internet on Dec. 27, 2022, 2 pages.
Control Access with Custom Claims and Security Rules, Available Online at: https://firebase.google.com/docs/auth/admin/custom-claims, Accessed from Internet on Dec. 22, 2022, pp. 1-11.
Creating Verifiers on the Web3Auth Dashboard, Available Online at: https://web3auth.io/docs/custom-authentication/verifiers, Accessed from Internet on Dec. 27, 2022, 15 pages.
Custom Authentication with Plug n Play Modal, Available Online at: https://web3auth.io/docs/sdk/web/modal/custom-authentication, Accessed from Internet on Dec. 27, 2022, 5 pages.
Google Social Login with Web3Auth, Available Online at: https://web3auth.io/docs/custom-authentication/social-providers/google#create-a-google-app, Accessed from Internet on Dec. 27, 2022, 4 pages.
Identity Platform Pricing, Available Online at: https://cloud.google.com/identity-platform/pricing, Accessed from Internet on Dec. 27, 2022, 6 pages.
Installation, Available Online at: https://web3auth.io/docs/sdk/self-host/installation, Accessed from Internet on Dec. 27, 2022, 12 pages.
Introduction to Wallet Onboard, Available Online at: https://plaid.com/docs/wallet-onboard/, Accessed from Internet on Dec. 22, 2022, 1 page.
Key Management and Security, Available Online at: https://web3auth.io/docs/overview/key-management/, Accessed from Internet on Dec. 27, 2022, 5 pages.
Migrating from Plug-and-Play to Custom Auth, Available Online at: https://github.com/Web3Auth/web3auth-web/discussions/421, Accessed from Internet on Dec. 27, 2022, 2 pages.
Privacy-First Auth to Onboard Your Users to Web3, Available Online at: https://www.privy.io/, Accessed from Internet on Dec. 27, 2022, 8 pages.
Shamir's Secret Sharing, Wikipedia, Available Online at: https://en.wikipedia.org/wiki/Shamir%27s_Secret_Sharing, Accessed from Internet on Dec. 22, 2022, pp. 1-8.
Social Login Users, Available Online at: https://web3auth.io/docs/server-side-verification/social-login-users#verifying-jwt-token-idtoken, Accessed from Internet on Dec. 22, 2022, pp. 1-6.
Usage Plug n Play Core, Available Online at: https://web3auth.io/docs/sdk/web/core/usage#openloginloginparams, Accessed from Internet on Dec. 27, 2022, 15 pages.
Using Auth0 with Web3Auth, Available Online at: https://web3auth.io/docs/guides/auth0, May 25, 2022, pp. 1-24.
Using Custom Authentication, Available Online at: https://web3auth.io/docs/custom-authentication/, Accessed from Internet on Dec. 22, 2022, pp. 1-4.
Web3Auth WalletConnect v1 Adapter, Available Online at: https://www.npmjs.com/package/@web3auth/wallet-connect-v1-adapter, Accessed from Internet on Dec. 27, 2022, 5 pages.
Jen, MetaMask API Method Deprecation, Available Online at: https://medium.com/metamask/metamask-api-method-deprecation-2b0564a84686, Jun. 27, 2022, 2 pages.
U.S. Appl. No. 18/100,925, "Non-Final Office Action", Mar. 29, 2023, 25 pages.
U.S. Appl. No. 18/100,925, "Notice of Allowance", Jul. 26, 2023, 10 pages.

* cited by examiner

900

RECEIVE A REQUEST FOR A DATA OBJECT FROM AN EXCHANGE PLATFORM, WHEREIN THE DATA OBJECT IS STORED IN A DATABASE AS AN ENCRYPTED DATA OBJECT
902

SEND A NOTIFICATION MESSAGE TO A CLIENT DEVICE SEEKING A RESPONSE FROM THE CLIENT DEVICE REGARDING THE REQUEST
904

RECEIVE A RESPONSE MESSAGE FROM THE CLIENT DEVICE APPROVING THE REQUEST
906

CAUSE THE DATABASE TO SEND AN ENCRYPTED METADATA FILE TO THE CLIENT DEVICE UPON RECEIVING THE RESPONSE MESSAGE, THE ENCRYPTED METADATA FILE COMPRISING A SECRET TOKEN ASSOCIATED WITH THE ENCRYPTED DATA OBJECT, THE ENCRYPTED METADATA FILE BEING ENCRYPTED WITH A USER PUBLIC KEY, THE CLIENT DEVICE BEING CONFIGURED TO DECRYPT THE ENCRYPTED METADATA FILE USING A USER PRIVATE KEY PAIRED WITH THE USER PUBLIC KEY TO IDENTIFY THE SECRET TOKEN ASSOCIATED WITH THE ENCRYPTED DATA OBJECT, THE CLIENT DEVICE BEING CONFIGURED TO GENERATE A CRYPTOGRAPHIC SIGNATURE USING THE SECRET TOKEN ASSOCIATED WITH THE ENCRYPTED DATA OBJECT AND TRANSMIT THE CRYPTOGRAPHIC SIGNATURE TO THE EXCHANGE PLATFORM, THE EXCHANGE PLATFORM BEING CONFIGURED TO GENERATE A DECRYPTION KEY USING THE CRYPTOGRAPHIC SIGNATURE
908

*FIG. 9*

US 12,047,496 B1

NONCUSTODIAL TECHNIQUES FOR GRANULAR ENCRYPTION AND DECRYPTION

FIELD

The present application generally relates to data storage and more particularly to noncustodial techniques for data encryption and decryption at a granular level.

BACKGROUND

Modern web applications and other online software platforms collect and store large volumes of data generated by users. This data is often monetized by the platforms, for example, for the generation of advertising revenue. While this data is allowed to be exported and monetized by users, it is difficult for users to efficiently and securely store large volumes of confidential data. Users are unlikely to be familiar with file encryption and decryption technology. Moreover, users might be reluctant to trust third-party storage providers with their confidential data.

SUMMARY

Various examples are described for employing noncustodial techniques for data encryption and decryption. One example method for noncustodial encryption can include receiving a selection of a data object for encryption from a plurality of data objects in a data package via a user interface; receiving a message from a remote server; generating an encryption key for the data object using the token message; encrypting the data object with the encryption key to create an encrypted data object; storing at least one portion of the message associated with the encrypted data object in a metadata file; encrypting the metadata file using a user encryption key to create an encrypted metadata file; and transmitting the encrypted data object and the encrypted metadata file to a database for storage.

One example client device for noncustodial encryption can include a communications interface; a non-transitory computer-readable medium; and a processor communicatively coupled to the communications interface and the non-transitory computer-readable medium. The processor can be configured to execute processor-executable instructions stored in the non-transitory computer-readable medium to receive a selection of a data object for encryption from a data package via a user interface, the data package comprising a plurality of data objects; receive a message from a remote server, the message comprising a secret token associated with the data object; generate an encryption key for the data object using the message; encrypt the data object with the encryption key to create an encrypted data object; store the secret token in a metadata file; encrypt the metadata file using a user public key; and transmit the encrypted data object and the encrypted metadata file to a database for storage.

One example method for decryption by a remote server can include receiving a request for a data object from an exchange platform, wherein the data object is stored in a database as an encrypted data object. The example method for decryption can also include sending a notification message to a client device seeking a response from the client device regarding the request and receiving a response message approving the request from the client device. The example method for decryption can further include causing the database to send an encrypted metadata file to the client device upon receiving the response message, wherein the encrypted metadata file comprises a secret token associated with the encrypted data object, wherein the encrypted metadata file is encrypted with a user public key, wherein the client device is configured to decrypt the encrypted metadata file using a user private key paired with the user public key to identify the secret token associated with the encrypted data object, wherein the client device is configured to generate a cryptographic signature using the secret token associated with the encrypted data object and transmit the cryptographic signature to the exchange platform, wherein the exchange platform is configured to generate a decryption key using the cryptographic signature.

Another example method for decryption by an exchange server include requesting, from a remote server, access to a data object associated with a user; receiving, from the remote server, a data package comprising a plurality of encrypted data objects, the data object corresponding to an encrypted data object of the plurality of encrypted data objects; receiving a decryption key associated with the encrypted data object, the decryption key not associated with other encrypted data objects of the plurality of encrypted data objects; and decrypting the encrypted data object using the decryption key.

One example system for decryption can include a non-transitory computer-readable medium; a communications interface; and a processor communicatively coupled to the communications interface and the non-transitory computer-readable medium. The processor can be configured to execute processor-executable instructions stored in the non-transitory computer-readable medium to receive a request for a data object from an exchange platform, the data object being stored in a database as an encrypted data object; send a notification message to a client device seeking a response from the client device regarding the request; receive a response message approving the request from the client device; and cause the database to send an encrypted metadata file to the client device upon receiving the response message. The encrypted metadata file comprises a secret token associated with the encrypted data object, and the encrypted metadata file is encrypted with a user public key. The client device is configured to decrypt the encrypted metadata file using a user private key paired with the user public key, generate a decryption key using the secret token associated with the encrypted data object, and transmit the decryption key to the exchange platform. The exchange platform is configured to decrypt the data object using the decryption key.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 9 shows an example method for decryption of a data object non-custodially encrypted.

DETAILED DESCRIPTION

Figure 1:
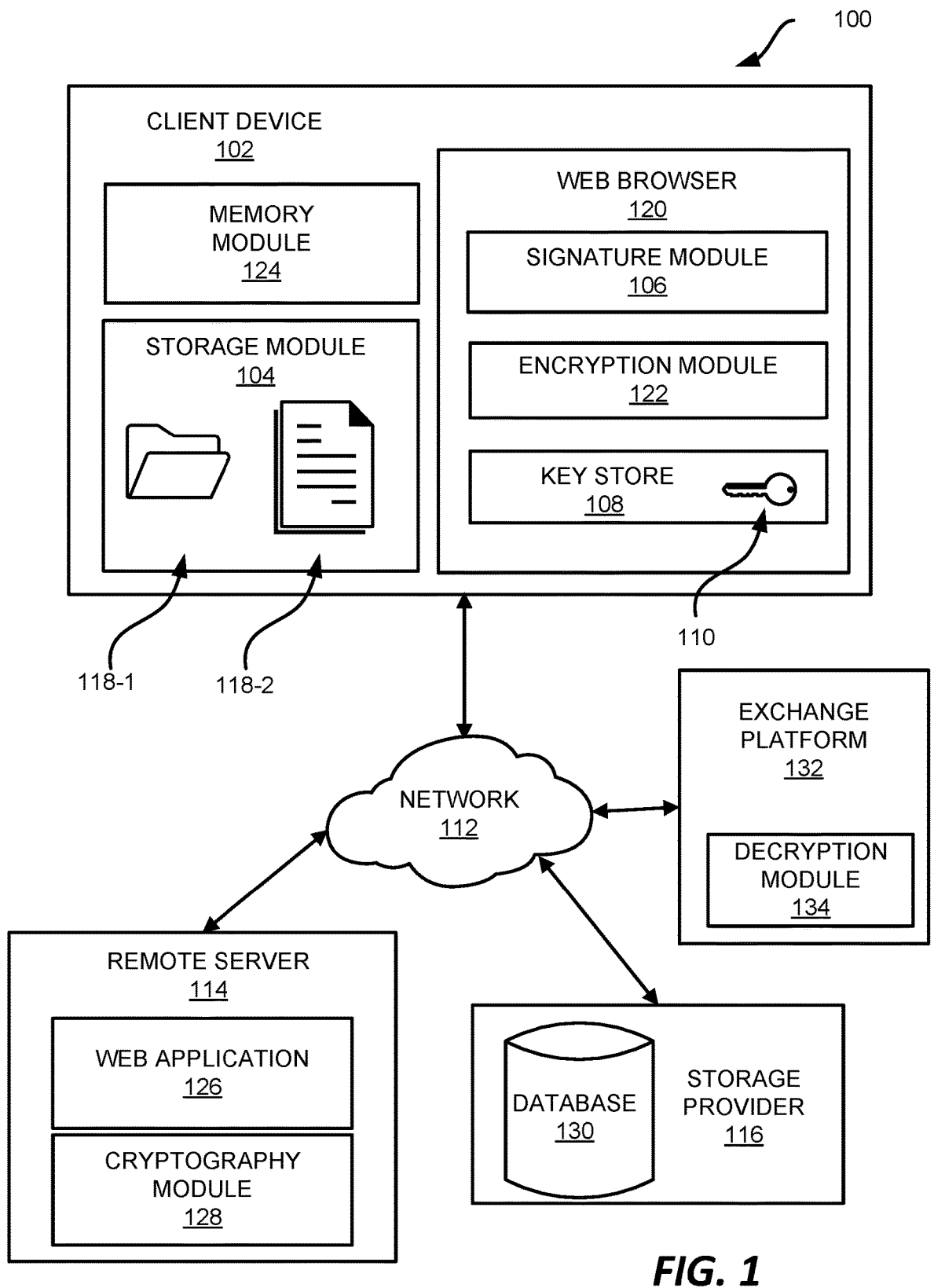
FIG. 1 shows an example system for granular encryption and decryption using noncustodial techniques.

Examples are described herein in the context of noncustodial techniques for data encryption and decryption. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

For many reasons, a user might wish to store data with a storage provider. For example, storing large volumes of data locally might simply be inconvenient. As another example, a user might want to provide their data to a third party to monetize it. If the data is confidential, the user desiring to store their data with a storage provider is forced to trust the storage provider to respect and maintain their privacy. Encrypting the data after it is transferred to the storage provider is an inadequate solution because privacy might be compromised prior to encryption. Additionally, this approach requires the means and secrets pertaining to data encryption to remain in the hands of the storage provider. In particular, if the storage provider encrypts the data, the storage provider also has and must retain the encryption key used to do so, thereby potentially compromising the user's privacy in the event the storage provider is comprised by a malicious actor.

One solution to this problem is for the user to encrypt the data and transmit the encrypted data to the storage provider. However, this leaves the user with the technical challenges of operating encryption software and key management. For most users, the risks and challenges associated with key management alone are substantial enough to make manual encryption an impractical solution. A technique is therefore needed to enable a user to encrypt their data prior to transmission to the storage provider, without any particular knowledge of encryption technologies and without ceding control of encryption secrets to the storage provider. In other words, the user can seamlessly encrypt their own data, using only secrets the user holds or can generate, prior to transmission to the storage provider.

Another problem arises when the user wants to share or monetize only portions of the encrypted data. If the user data is encrypted in one package, the user may lose track of where the content is stored. Also, it is difficult to only share a specific portion with third parties without disclosing the entire data package. Especially when the files are large, decrypting at the client device and then sending to a third party can burden the processing capacity of the client device and consume a substantial amount of network bandwidth.

Examples of noncustodial techniques for data encryption and decryption at a granular level are described herein to address these issues. In one example, a remote server provides a web application for encrypting data objects on a client device and a user downloads the web application via a web browser. A user can then select data objects using the web application executed in the web browser to encrypt and upload the encrypted data objects to a database for storage.

The user can select data objects in a data package from a local storage on a client device for encryption using the web application. A data object can be a folder (or a hierarchical folder structure) or a data file in any format. The user has custody of the data package. That is, the user owns or controls access to the data package. The data package can include data generated or owned by the user, such as from using a specific service application. The data package can be a multi-level data package, including different hierarchical levels. In one example, the multi-level data package is a zip folder including three levels. The top-level is the zip folder. The second level includes two or more folders within the zip folder. The third level includes data files within each folder at the second level. Folders and data files at different levels can be selected for encryption except for the top-level folder. That is, the web application can encrypt all the folders and data files included in the zip folder, but it does not encrypt the zip folder itself. This way, the multi-level data package can be encrypted at a granular level.

In this example, when the user is ready to upload a first data object from a multi-level data package, the user clicks the "upload" button on the web application, and a dialog box appears allowing the user to select the first data object for encryption and subsequently upload to the storage system. Selection of first data object generates an encryption request to the remote server. The remote server responds by randomly generating a first secret token, for example "abcd1234." A first signing request is sent to the web application. The first signing request includes a first secret token and information about a first signature algorithm. The first signing request directs the web application to cryptographically sign the first secret token with the first signature algorithm indicated in the first signing request to create a first cryptographic signature, using a private key that is only available to the user. The first cryptographic signature can be a randomly generated string. For example, the signature is a hexadecimal value, like 0x1e99398d.

The first cryptographic signature is then converted to a text string and used as input to a first symmetric encryption algorithm. The first symmetric encryption algorithm generates a first symmetric encryption key using the first cryptographic signature. The symmetric encryption key is then used to encrypt the first data object to create a first encrypted data object. The first encrypted data object is then uploaded to a database at a storage provider for storage.

Meanwhile, the first token message is saved in a metadata file together with a description of the first data package. The metadata file can also include a location or an address where the first encrypted data object is stored, such as a Uniform Resource Locator (URL) for the first encrypted data object. The metadata file can also include information relating to the first signature algorithm. The web application, the remote server, or the storage provider does not store the first cryptographic signature nor the first symmetric encryption key. Instead, these are generated by the web application using encryption information only accessible by the user, such as from an electronic wallet or other encryption key storage mechanism. Thus, the selected data object is protected both by the user's sole access to the private key and by the secret token provided by the remote server.

The user can then select a second data object from the same multi-level data package from where the first data object is selected. A second encryption request to the remote server is generated after the user selects the second data object for encryption and upload via the web application. The remote server responds by randomly generating a second secret token. A second signing request is then sent to the web application. The second signing request includes a second token message containing the second secret token and information about a second signature algorithm. The second signing request directs the web application to cryptographically sign the second secret token with the second signature algorithm indicated in the second signing request to create a second cryptographic signature, using the private key that is only available to the user. The second signature algorithm can be the same or different from the first signature algorithm used for creating the first cryptographic signature. The second cryptographic signature is used as input to a second symmetric encryption algorithm. The second symmetric encryption algorithm generates a second symmetric encryption key using the second cryptographic signature. The second symmetric encryption algorithm can be the same as or different from the first symmetric encryption algorithm used for creating the first symmetric encryption key. The second symmetric encryption key is then used to encrypt the second data object to create a second encrypted data object. The second encrypted data object is then uploaded to a database at a storage provider for storage. Meanwhile, the second secret token is saved in the metadata file together with a description of the second data package. The metadata file can also include a location or an address where the first encrypted data object is stored, such as a URL for the second encrypted data object. The metadata file can also include information relating to the second signature algorithm.

Similarly, the user can select other data objects in the same multi-level data package to be individually encrypted and uploaded as other encrypted data objects. Similarly, the secret tokens generated for other selected data objects are saved in the metadata file together with descriptions of the other selected data packages. The metadata file can also include a location or an address where each of the other encrypted data objects is stored, such as a URL for each of the other encrypted data objects. The metadata file can also include information relating to other signature algorithms used. The metadata file can be a JavaScript Object Notation (JSON) file. When all the data objects the user wants to encrypt and upload are encrypted and uploaded, the user then encrypts the metadata file with a user encryption key. In some examples, the metadata file is encrypted with a public key that is paired with the private key to create an encrypted metadata file. The encrypted metadata file is then uploaded to a database at the storage provider for storage.

The remote server then publishes a schema regarding the encrypted data objects from the multi-level data package and the associated encrypted metadata file. The schema includes a name or description of each encrypted data object. The schema also includes a description of the data structure of the multi-level data package where the encrypted data objects are selected from. The schema further includes contact information of the user who owns the encrypted data objects. The remote server or the storage provider or another party can identify the data structure of the multi-level data package and names or descriptions of the encrypted data objects, but does not own or have access to the content of the encrypted data objects. In other words, the remote server can provide noncustodial encryption for data packages; and the storage provider can have custody of the encrypted data objects, but not the custody of the unencrypted data objects or the information needed to decrypt the encrypted data objects.

At later time, a third party, for example an exchange platform, can send a request to the remote server for access to certain data objects owned by a user. The user can authorize the exchange platform to access certain the certain data objects requested without providing access to all of the encrypted data objects. The exchange platform can be an application ecosystem comprising one or more applications related to certain products or services. The one or more applications can collect user data to create or improve the products or services. The exchange platform can be a marketplace platform where data can be monetized. In some examples, the exchange platform is a third-party platform. In some examples, the exchange platform is part of the remote server. In some examples, the one or more applications on the exchange platform send a request message to the remote server for access to certain data objects based on schemas published by the remote server. In some examples, the exchange platform itself sends a request message to the storage system for access to certain data. The request message can be a JSON web token. The request message can include a scope of the data being required, such as user transaction data at a specific store.

In this example, a third-party exchange platform sends a request message for access to a data object. Upon receiving the request message, the remote server sends a notification message to a user who owns the requested data objects encrypted and stored at a storage provider. The notification message is displayed as a web design element, such as a pop-up window or a modal, on a client device associated with the user. The notification message includes options for the user to choose regarding the request, such as "allow" or "deny." When the user selects to allow the request, the storage provider sends the encrypted metadata file to the user and the encrypted data object to the third-party exchange platform. The user decrypts the encrypted metadata file in the web application with the private key unique to the user. The owner then signs the token message saved in the metadata file corresponding to the encrypted data object, using the private key, to generate a cryptographic signature using a signature algorithm associated with the secret token. The web application sends to the third-party exchange platform the cryptographic signature to decrypt the encrypted data object. The remote server logs the access request and the user's decision regarding the access request.

When the third-party exchange platform receives the cryptographic signature for the encrypted data object, the third-party exchange platform uses the cryptographic signature as input to the same symmetric encryption algorithm used for encrypting the requested data object to obtain a symmetric decryption key. The symmetric decryption key can decrypt the encrypted data object. The symmetric decryption key is the same as the symmetric encryption key used for encrypting the requested data object.

The third-party exchange platform can also encrypt the decrypted data object with a public key from the remote server and upload the public-key-encrypted data onto the third-party exchange platform. When the public-key-encrypted data is uploaded to the third-party exchange platform, the remote server can perform a fraud check. The fraud check can be initiated by the remote server to protect data integrity or initiated by a user with whom the data object is supposed to be associated.

In this example, the remote server initiates a fraud check for a data object offered on the third-party exchange platform, the remote server requests access to the corresponding data object from a respective user, similar to how the exchange platform obtains access to the requested data object from the respective user. Since the respective user has granted the exchange platform access to the requested data, the noncustodial protocol can be waived. When the respective user allows the request by sending a corresponding cryptographic signature to the remote server, the remote server decrypts the encrypted data object stored at a storage provider. Meanwhile, the remote server decrypts the public-key-encrypted data object with a private key paired with the public key. The remote server then compares the data object decrypted from the encrypted data object stored at the storage provider by the respective user and the data decrypted from the public-key-encrypted data object by the exchange platform. If the two sets of data match, the data on the exchange platform can be authenticated. If the two sets of data do not match, the data on the exchange platform cannot be authenticated. That is, the data offered on the third-party exchange platform may be fraudulent.

The noncustodial techniques for data encryption and decryption at a granular level described herein enable users to have greater control over their own data, such as preventing a third party from accessing user data without consent from the user. Encrypting data at a granular level enables users to only give access to the user data requested without disclosing other user data. The metadata file provides a map of encrypted user data and the respective encryption/decryption solutions so that the user can keep track of their data property. A published schema for encrypted user data enables a third party to identify which data they may be interested in acquiring access to. Decryption at a third party relieves the processor on the client device, especially for large media files.

This illustrative example is given to introduce the reader to the general subject matter discussed herein and the disclosure is not limited to this example. The following sections describe various additional non-limiting examples and examples of noncustodial techniques for data encryption and decryption.

Referring now to FIG. 1, FIG. 1 shows an example system 100 for granular encryption and decryption using noncustodial techniques. The example system 100 includes a client device 102, a remote server 114, a storage provider 116, and an exchange platform 132, which are connected across one or more networks, collectively network 112.

The client device 102 may be a conventional computing device, such as a desktop or laptop computer having processors and computer-readable media, connected to the remote server 114, the storage provider 116, and the exchange platform 132 via network 112. The client device 102 can also be a mobile device, such as a tablet or a smart phone. Network 112 can include the internet, any local area network ("LAN"), metro area network ("MAN"), wide area network ("WAN"), cellular network (e.g., 3G, 4G, 4G LTE, 5G, etc.), or any combination of these.

The client device 102 has access to data objects 118 containing user-proprietary data such as confidential data. The data objects can be folders 118-1 or data files 118-2. The data objects are saved in any suitable file structure that can be identified by the web application 126 of the remote server when launched in a web browser 120 on client device 102 for a user to select. In some examples, the data objects 118 are stored in a local storage module 104. However, the data objects 118 can be stored anywhere that is normally accessible by client applications, such as a network drive, external drive, or locally mounted cloud storage. The client device 102 includes a web browser 120 or similar application used to connect to the remote server 114 and storage provider 116 over the network 112. A native desktop application on a desktop computer or a dedicated mobile application on a smartphone could also be used. The web browser 120 may contain additional applications in the form of, for example, browser extensions, plug-ins, or other add-ons. The web browser 120 may be a blockchain browser, suitable for accessing web3 decentralized applications. The web browser 120 may have an integrated blockchain wallet. The memory module 124 provides for ephemeral storage of data during program execution.

In some examples, the web browser 120 includes a signature module 106, a key store 108, and an encryption module 122. These components may be installed as web browser 120 extensions or may reside in the browser runtime, for example, by way of Javascript code downloaded from a web application. In some examples, these components are standalone applications running outside of the web browser 120. In some examples, some or all of these components are implemented by a blockchain wallet. The blockchain wallet may itself be a web browser 120 extension.

The signature module 106 can implement one or more digital signature algorithms. Some examples of digital signature algorithms that may be implemented by the signature module 106 include but are not limited to asymmetric cryptographic algorithms such as RSA (the signature operation of the Rivest-Shamir-Adleman asymmetric cryptosystem), DSA (Digital Signature Algorithm), and ECDSA (Elliptic Curve Digital Signature Algorithm). The signature module 106 obtains a private key 110 from the key store 108 in order to digitally sign input data to produce a cryptographic signature. In some examples, the signature module 106 requires the client device to confirm the user's intent to carry out a digital signature.

The encryption module 122 can implement one or more password-based encryption algorithms, such as implementations of the schemes specified in IETF (Internet Engineering Task Force) RFC (Request for Comments) 8018, "PKCS [Public Key Cryptography Standards] #5: Password-Based Cryptography Specification." Such schemes include but are not limited to key derivation functions PBKDF1 (Password-Based Key Derivation Function 1) and PBKDF2 (Password-Based Key Derivation Function 2) as well as encryption schemes PBES1 (Password-Based Encryption Scheme 1) and PBES2 (Password-Based Encryption Scheme 2). Examples of algorithms suitable for key derivation function PBKDF2 include but are not limited to HMAC (Hash-Based Message Authentication Code) with SHA (Secure Hash Algorithm)-1, SHA-224, SHA-256, SHA-384, SHA-512, SHA-512/224, and SHA-512/256. An example cryptographic algorithm suitable for the PBES2 encryption scheme is AES (Advanced Encryption Standard)-CBC (Cipher Block Chaining)-Pad, but other algorithms may be used as well.

The key store 108 hosts a private key 110 used for carrying out digital signatures. The private key 110 is one in a pair of keys generated in an asymmetric cryptographic algorithm, the other key being a public key. In an asymmetric algorithm, the security of the algorithm depends on keeping the private key secret. The private key may be used for operations like encryption and signing, while the corresponding public key may be used for the complementary operations like decryption and signature verification. The key store 108 may be a part of a web browser 120 extension, or reside in memory module 124 or the web browser 120 runtime, for example as a result of the execution of Javascript code in the web browser 120. The key store 108 may also be a standalone application. In some examples, the key store 108 is implemented by a blockchain wallet, including storage of the private key 110. In some examples, the private key 110 is generated using a secret sharing algorithm, for example, Shamir's Secret Sharing. In that case, the key store 108 may host only a portion of the private key 110, and the remaining portions are hosted on remote devices (not shown).

The remote server 114 hosts a web application 126 that can coordinate the noncustodial techniques for data encryption and decryption. In some examples, the remote server 114 hosts backend services for the web application. The remote server also contains a cryptography module 128. The cryptography module 128 generates and stores a secret token which is unique for each encryption request from a client device associated with a user. In some examples, the secret token takes the form of binary data. In some examples, the secret token is a text string including alphabetic or alphanumeric characters. In some examples, the secret token is a text string that is randomly generated and cryptographically secure. The cryptography module 128 also generates a signing request including a token message for the user to sign. The signing request or the token message may specify a signature algorithm. For example, the cryptography module 128 may specify in the signing request that the client device 102 use ECDSA. The signature algorithm may be specified in the signing request so that the same signature algorithm is used for both encryption and decryption. The remote server 114 stores the secret token only. Neither the signature generated by the client device 102 nor the private key 110 is ever sent to nor stored by the remote server 114.

The storage provider 116 is a server that provides file storage services across the network 112. The storage provider 116 can host and store the encrypted data objects in database 130. In some examples, the remote server 114 and the storage provider 116 are located in the same server. In some examples, the storage provider 116 is a cloud storage provider. After the client device 102 encrypts the data objects 118 using the techniques described herein, the data objects 118 is uploaded to the storage provider 116 for storage in their encrypted form.

The exchange platform 132 can be an application ecosystem comprising one or more applications related to certain products or services. The one or more applications can collect user data to create or improve the products or services. The exchange platform 132 can be a marketplace platform for data monetization. In some examples, the one or more applications sends a request message to the remote server 114 for access to certain encrypted data stored with the storage provider 116. In some examples, the exchange platform 132 itself sends a request message to the remote server 114 for access to certain encrypted data stored with the storage provider 116.

Figure 2:
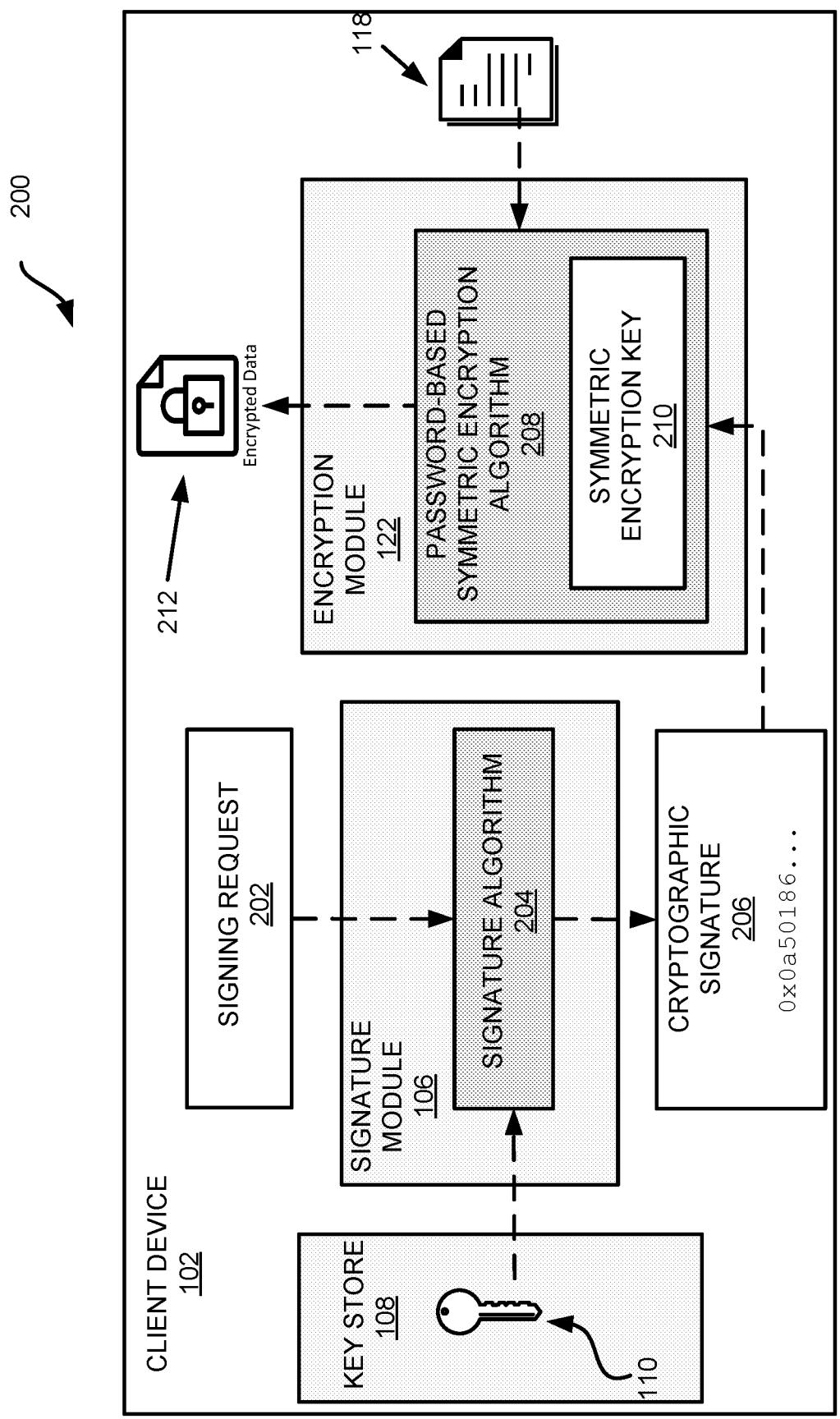
FIG. 2 shows an example system in which a client device encrypts a data object.

Referring now to FIG. 2, FIG. 2 shows an example system 200 in which a client device 102 encrypts a data object. As discussed above, the client device 102 receives a web application from a remote server, such as after the user enters an address for a web site hosted by the remote server. The web application includes functionality to obtain information to encrypt data objects within a data package and to upload the encrypted data package for storage. The web application also allows the user to request previously encrypted data packages stored and to obtain information needed to generate decryption keys.

The client device 102 allows the user to select any suitable data package for encryption. A data package can include one or more data objects stored in a hierarchical file structure. For example, the data object 118 can be from a data package including multiple data objects, as illustrated in FIG. 3.

Figure 3:
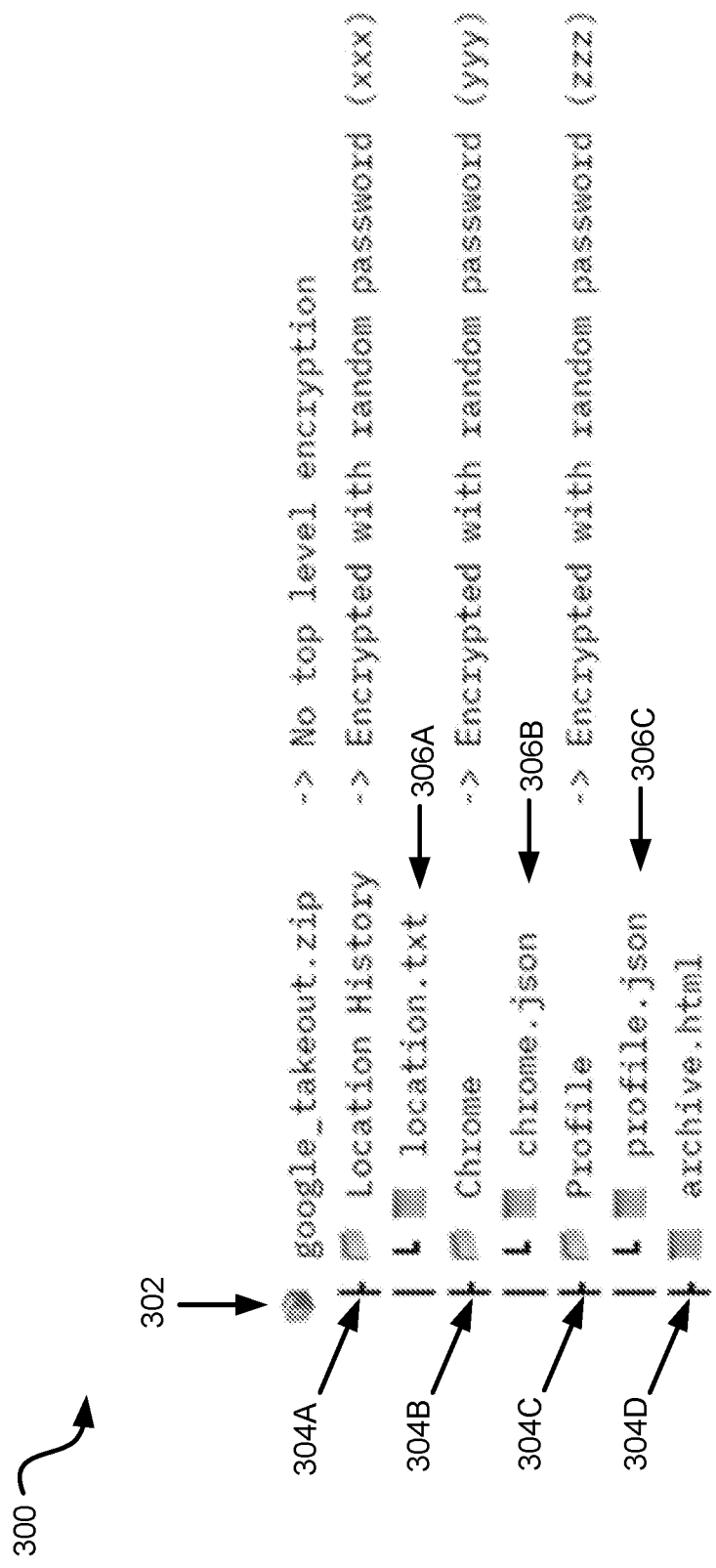
FIG. 3 shows an example data package including multiple data objects.

Referring now to FIG. 3, FIG. 3 shows an example data package 300 including multiple data objects. In this example, the data package is a zip folder 302. The data package 300 has three hierarchical levels, including a data package level and two data object levels. The zip folder 302 is at the data package level. The zip folder 302 includes a folder 304A, a folder 304B, a folder 304C, and an html file 304D. Data objects 304A-304D are at the same hierarchical level, namely, the first data object level. In this example, folder 304A contains a text file 306A, folder 304B contains a json file 306B, and folder 304C contains a json file 306C. As shown in FIG. 3, data objects 306A-306C are at the same hierarchical level, namely, the second data object level. It should be appreciated that because both files and folders (or paths) can be data objects, examples according to this disclosure can encrypt individual files or can encrypt an entire folder (or path) including sub-folders (or sub-paths) using a single encryption key. However, in general, the top-level folder (or path) is generally not encrypted in its entirety as such a strategy may not allow for the discrete selection and encryption of individual data objects as discussed within this description.

The data package 300 can be encrypted at a granular level, such as by separately encrypting individual files or folders, independently of other files or folders within the data package. In this example illustrated herein, the data package 300 is not encrypted into one encrypted data object but instead, individual data objects are each separately encrypted as encrypted data objects. Specifically, the zip folder 302 is not encrypted as one encrypted data package, and instead, some data objects within the zip folder 302 are selected for encryption individually. As illustrated herein, data objects 304A-304C are selected for encryption individually, but data object 304D is not selected for encryption. Similarly, data objects 306A-306C can also be selected for encryption individually.

Figure 4:
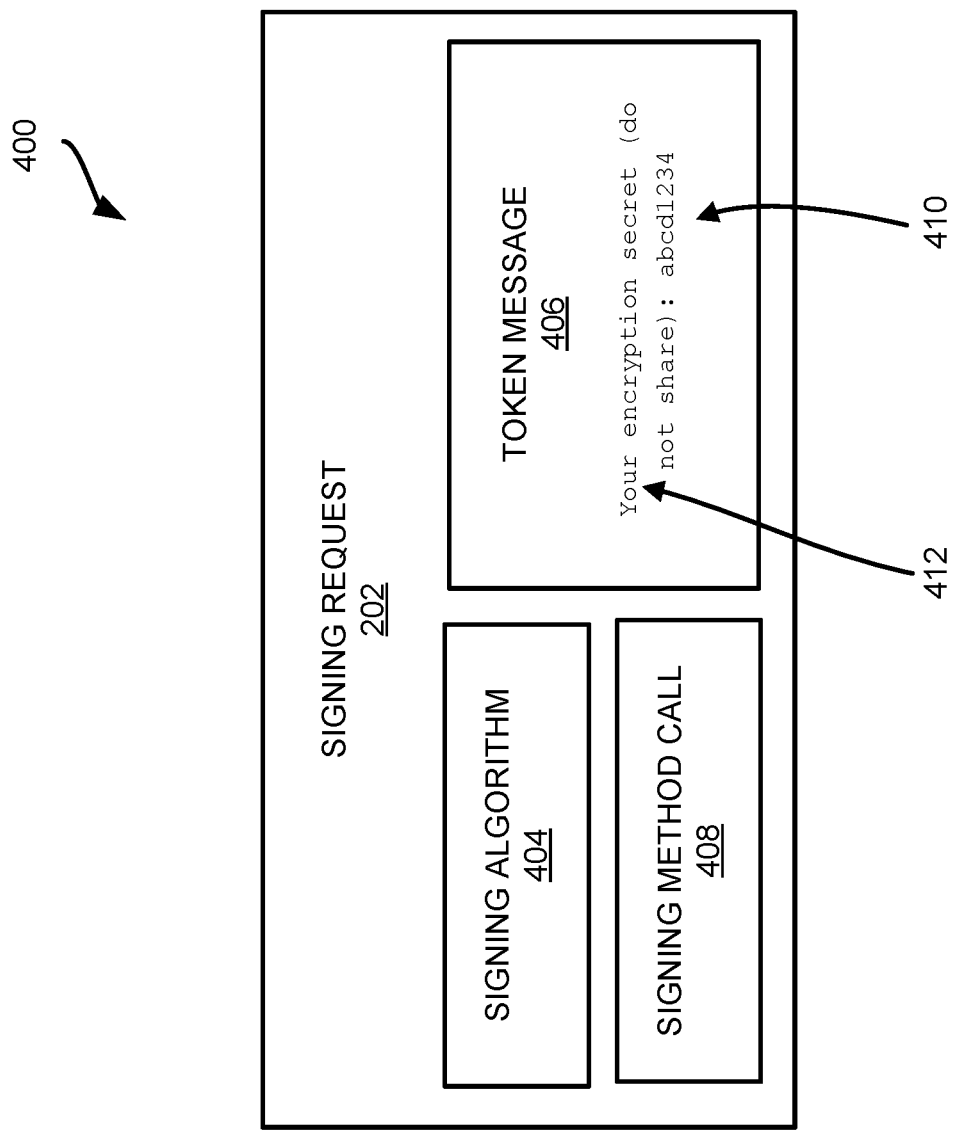
FIG. 4 shows an example of a signing request sent to a client device by a remote server.

Now returning to FIG. 2, when a user selects a data object 118 for encryption and storage, the client device 102 transmits an encryption request to a remote server 114 to obtain a token to generate an encryption key. After receiving the request, the remote server 114 generates a signing request 202 and sends it to the client device 102 upon receiving the encryption request from client device 102. FIG. 4 illustrates an example system 400 of a signing request 202.

Referring now to FIG. 4, the client device 102 receives the signing request 202, and the signature module 106 on the client device 102 processes the signing request 402. The signing request 402 contains a token message 406 generated by the remote server 114. The token message 406 include a random token 410 corresponding to the request from the client device 102. The token 410 is unique to each request from the client device 102. The token message 406 can contain a text 412 describing the secret token 410 that can be displayed to the user, in some examples. In some examples, the text 412 is intended to make the token message 406 easier to understand for users; without the text 412, the token message 406 will contain only the secret token 410 which might be unintelligible to some users.

In some examples, the signing request 402 specifies a signing algorithm 404 for the client device 102 to use when signing the secret token. For example, the signing request 402 may specify that the client device 102 use ECDSA. This may be specified so that the same signature algorithm can be used for both encryption and decryption. The signing request may also (or instead) contain a signing method call 408. The signing method call 408 can direct the signature module 106 to sign some data according to an application programming interface (API) specification. For example, the signing method call 408 may correspond to the API specification published by a blockchain organization, such that the signing method call 408 can be available on the client device 102 in the signature module 106, regardless of the details of the implementation. In some examples, the signing method call 408 may specify the signature algorithm. In some other examples, the signing method call 408 may implicitly support only a single algorithm. For example, the signing method call 408 may be "eth_sign" which is a signature method that may be implemented in the client device 102. In this example, the API documentation may specify that a particular signature algorithm be used by the implementing client device 102. In some cases, the specified signature algorithm is ECDSA. Other methods may be used as well. For example, the "eth_signTypedData" from the publication EIP (Ethereum Improvement Proposal)—712 may be used in some implementations, which similarly implicitly specifies the signing and hash algorithms to be used by the client device 102.

Now returning to FIG. 2, once the client device 102 receives the signing request 202, the signature module 106 of the client device 102 starts to process the signing request 202. The signature module 106 may select a signature algorithm 204 as specified in signing algorithm 404 of the signing request 402. In some examples, the signature algorithm 204 is implicitly selected by the signing method call 408 used in the signing request 402. The selected signature algorithm 204 processes the token message 406 along with the private key 110 obtained from the key store 108 to produce a cryptographic signature 206. The signature algorithm 204 may first calculate the cryptographic hash of the token message 406, and then sign the resulting hash. For instance, the SHA-3 or Keccak hash algorithm may be used to calculate the cryptographic hash of the token message 406, and then ECDSA asymmetric signing algorithm may be used to sign the resulting hash. The cryptographic signature 206 can be represented as a text string. In some examples, the cryptographic signature 206 is a cryptographic hash value.

The cryptographic signature 206 is then sent to the encryption module 122 of the client device 102. The cryptographic signature 206 is used by a password-based symmetric encryption algorithm 208 to derive a symmetric encryption key 210. A symmetric encryption algorithm is one in which the same key is used for both encryption and decryption, and therefore, the security of a symmetric algorithm resides in the security of the key. In this example, the symmetric encryption key 210 is derived from the cryptographic signature 206 received from the signature module 106. In some examples, the password-based symmetric encryption algorithm 208 can employ a salt or iteration count to bolster the security of the generated symmetric encryption key 210. The password-based symmetric encryption algorithm 208 then encrypts the selected data object 118 and generates an encrypted data object 212. The encrypted data object 212 can only be decrypted with the identical symmetric encryption key 210 that was used for creating the encrypted data object 212. Therefore, the same password-based symmetric encryption algorithm 208 can be used, with the same configuration, to ensure that the same symmetric encryption key 210 is generated for both encryption and decryption.

It should be appreciated that while this example references encrypting one data object, the data object can be a folder or path. Thus, encrypting one data object may involve encrypting multiple data files within a folder or path using the same encryption key. Alternatively, each data file within the folder or path may be encrypted using a different encryption key generated based on discrete tokens for each data file to be encrypted. In some examples, the user may select multiple data files to be encrypted using the same encryption key. For example, a group of data files may relate to the same information type of information, such as a group of source code files for common functionality, e.g., corresponding .h and .cxx files. However, some examples may separately encrypt each of such using a different encryption key, as discussed above.

The token 410 in the signing request 202 used for generating the cryptographic signature 206 can be stored in a metadata file. For each individually selected data object, a unique token 410 is provided. However, if the user selects multiple data objects to be encrypted together, such as by selecting multiple data files or by selecting a folder that includes multiple files, a single unique token may be used for all of the selected data files. Information relating to the signing algorithm 404 used for creating the cryptographic signature 206 can also be saved in the metadata file. When multiple data objects from one data package are encrypted separately, the corresponding unique tokens can be saved into one metadata file. The metadata file can be encrypted and uploaded to a storage provider.

Figure 5:
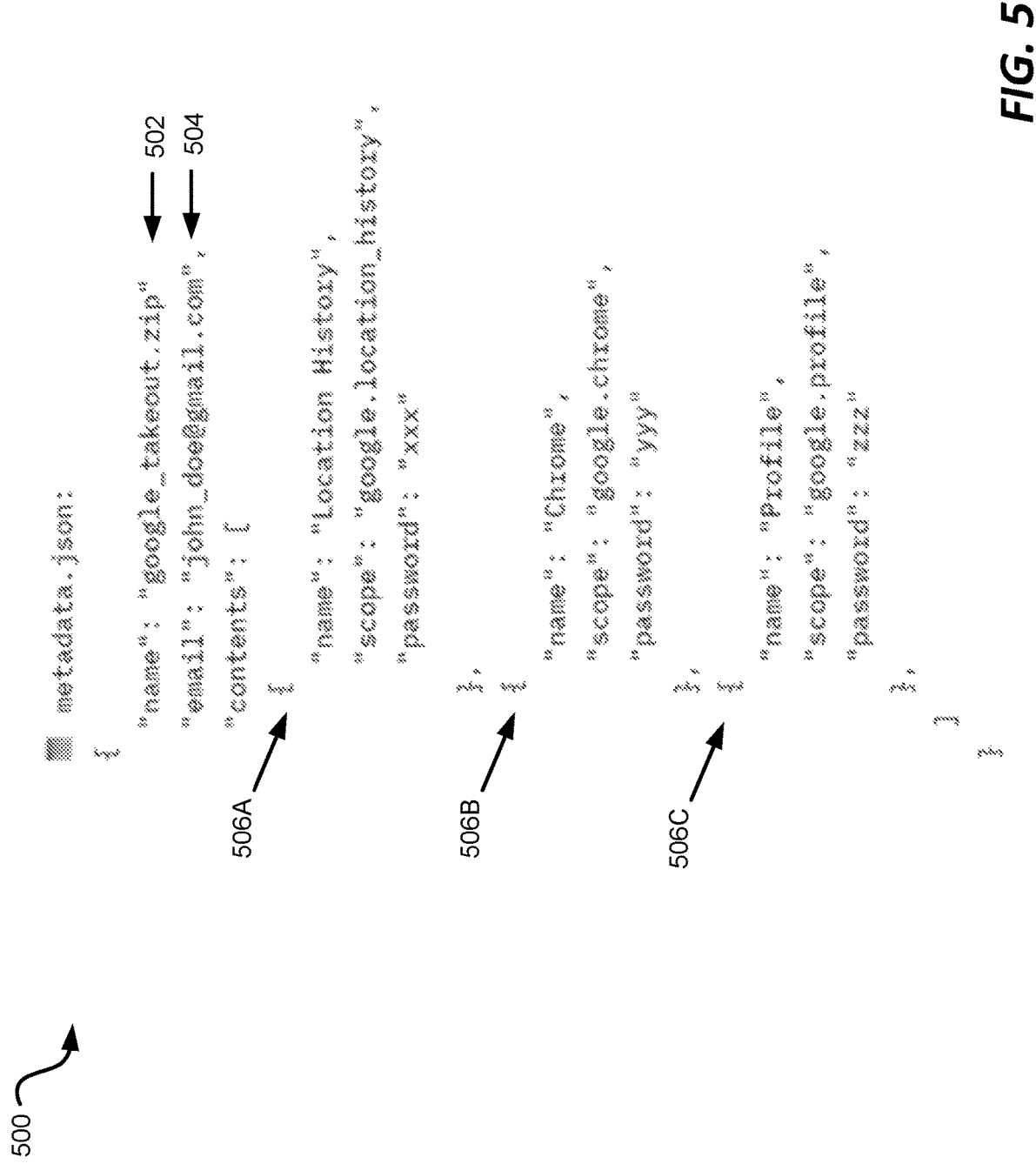
FIG. 5 shows an example metadata file.

Referring now to FIG. 5, FIG. 5 shows an example metadata file 500. The example metadata file 500 includes a name 502 of the data package from where some data objects are selected for encryption. The example metadata file 500 also includes an email address 504 of the user who owns the data package. The example metadata file further includes information related to encrypted data objects 506A-506C. Information related to each encrypted data object includes the name of the data object, the data scope of the data object, and the password for encrypting the data object. In some examples, the password is a secret token unique to each encrypted data object.

While the example metadata file does not identify the encryption technique used to encrypt each data object, some examples may include such information. The encryption technique may be identified by an identification number, a software version number (e.g., of the web application used to encrypt the data object(s)), or other suitable identification information.

Referring again to FIG. 2, after the client device encrypts the selected data object(s) and generates the appropriate metadata to include in the metadata file, it may ask the user if they wish to select any other data objects within the data package. If so, the same process may be repeated until the user has selected all desired data objects for encryption. The data package with the encrypted data objects and the corresponding metadata file can then be uploaded to a storage provider for long-term storage. Notably, the encryption keys used to encrypt the data objects are not sent for storage and instead are ephemeral and are not stored anywhere. Instead, as discussed above, the information needed to re-generate the encryption keys remains solely with the user, e.g., within their person cryptographic wallet, with the exception of the random tokens that are stored in the metadata file. However, as discussed above, these random tokens cannot themselves be used to decrypt any of the data objects. Thus, the encrypted contents of the data package are secure and cannot be accessed without the user's permission, even if a malicious actor accesses the storage server and obtains the data package and corresponding metadata file. However, this can also allow the user to authorize third parties to access specific data objects within the data package.

Figure 6:
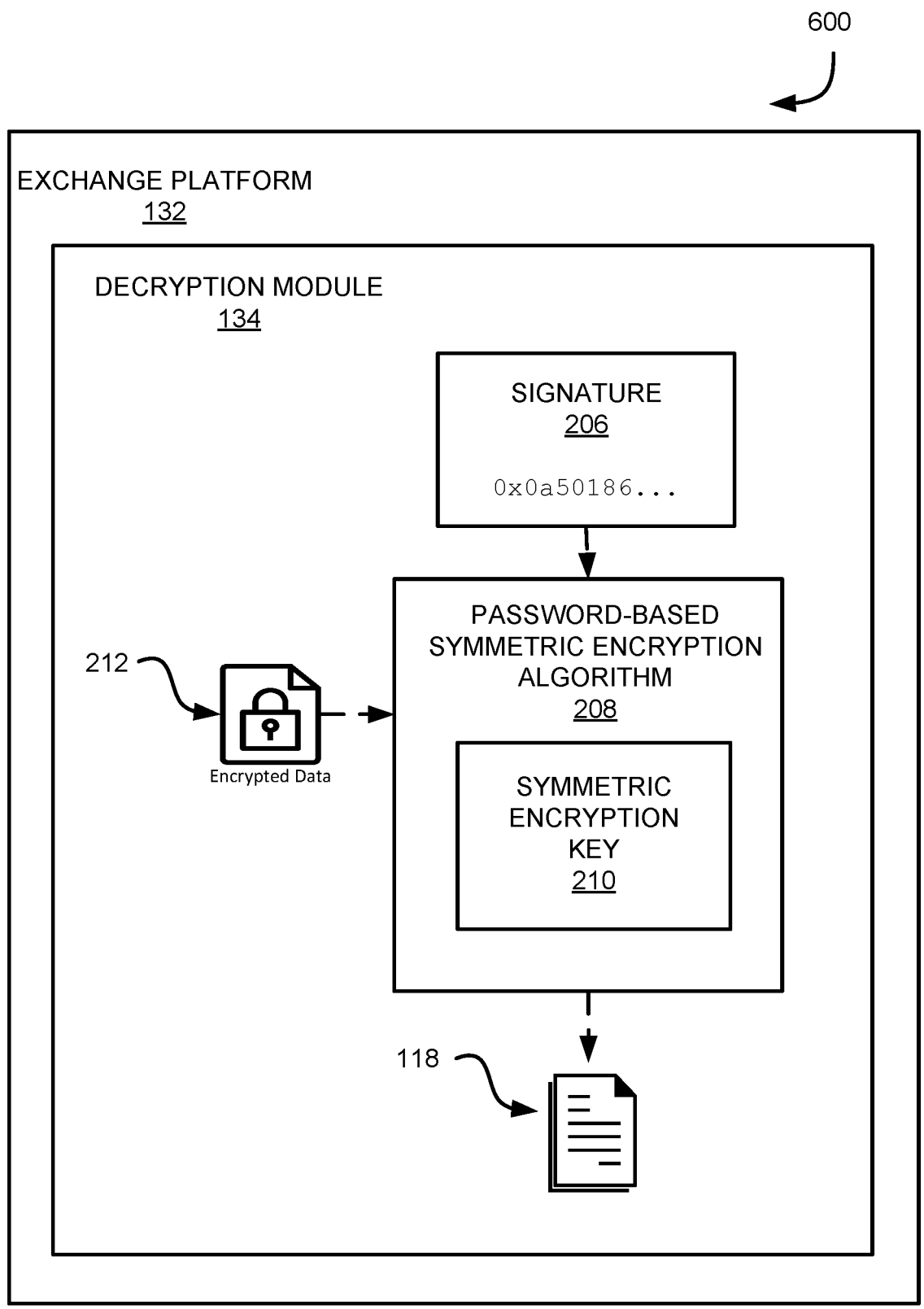
FIG. 6 shows an example system in which an exchange platform decrypts an encrypted data object.
Figure 7:
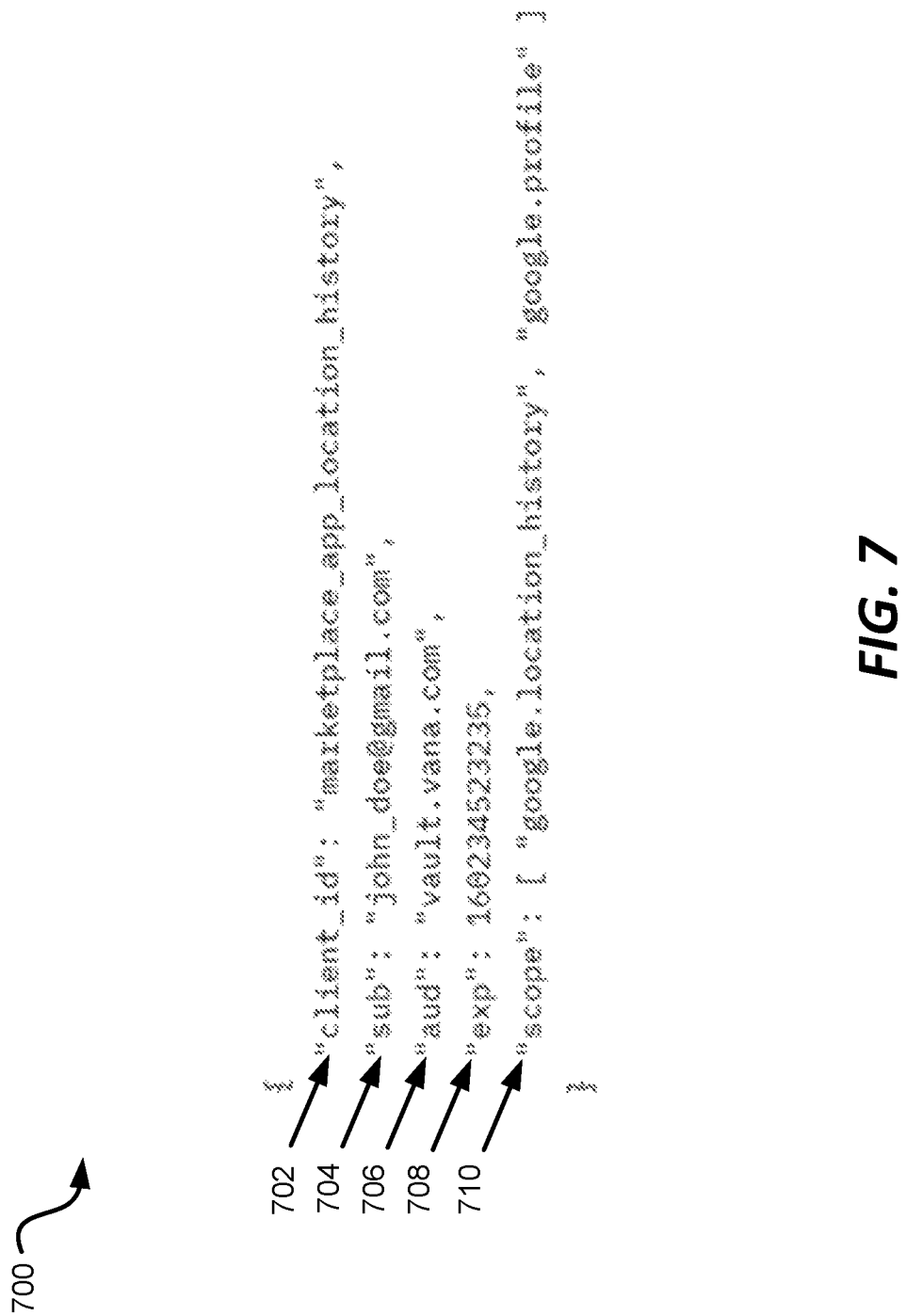
FIG. 7 shows an example request sent by an exchange platform to a remote server for access to data objects.

Referring now to FIG. 6, FIG. 6 shows an example system 600 in which an exchange platform 132 seeks to obtain access to one or more of the user's data objects. To do so, the exchange platform 132 must request permission from the user and, if permission is granted, it can then decrypt the requested encrypted data object 212. To do so in this example, the exchange platform 132 sends a request to the remote server 114 for access to a data object 118 which is encrypted as an encrypted data object 212. FIG. 7 shows an example request sent by the exchange platform 132 to a remote server 114 for access to data objects.

Referring now to FIG. 7, FIG. 7 shows an example request 700 sent by an exchange platform 132 to a remote server 114 for access to data objects 118. The example request 700 includes a client identification 702 indicating the party from which the request message is sent, a subject 704 indicating the party who owns the requested data objects, an audience 706 indicating the party to which the request message is sent, an expiration time 708 indicating a period (in the unit of seconds) for how long the request message is valid, and a scope 710 indicating the description of the requested data objects. While this example request 700 includes certain information, requests may include any suitable information, such as proposed payment information, license terms, a duration for permitted access, permitted uses of the identified information, or other terms or information.

Now returning to FIG. 6, upon receiving the request from the exchange platform, the remote server 114 sends a notification message to the client device 102, seeking a response to the request from the client device 102. If the client device approves the request, the remote server 114 causes the storage provider 116 to send the metadata file to the client device 102 and the encrypted data object 212 to the exchange platform 132. The client device 102 decrypts the metadata file with the unique private key to obtain the saved token message 406 corresponding to the encrypted data object 212. The signature module 106 creates the same cryptographic signature 206 as illustrated in FIG. 2 for encrypting the data object 118. The same cryptographic signature 206 is then transmitted to the exchange platform 132. The decryption module 134 on the exchange platform 132 includes the same password-based symmetric encryption algorithm 208 as in the encryption module 122 of the client device 102 as illustrated in FIG. 2. The password-based symmetric encryption algorithm 208 in the decryption module 134 then creates the same symmetric encryption key 210 with the same signature 206. The encrypted data object 212 from the storage provider 116 is then decrypted with the same symmetric encryption key 210 that encrypted the original data object 118. The exchange platform can then access the unencrypted data object 118.

Figure 8:
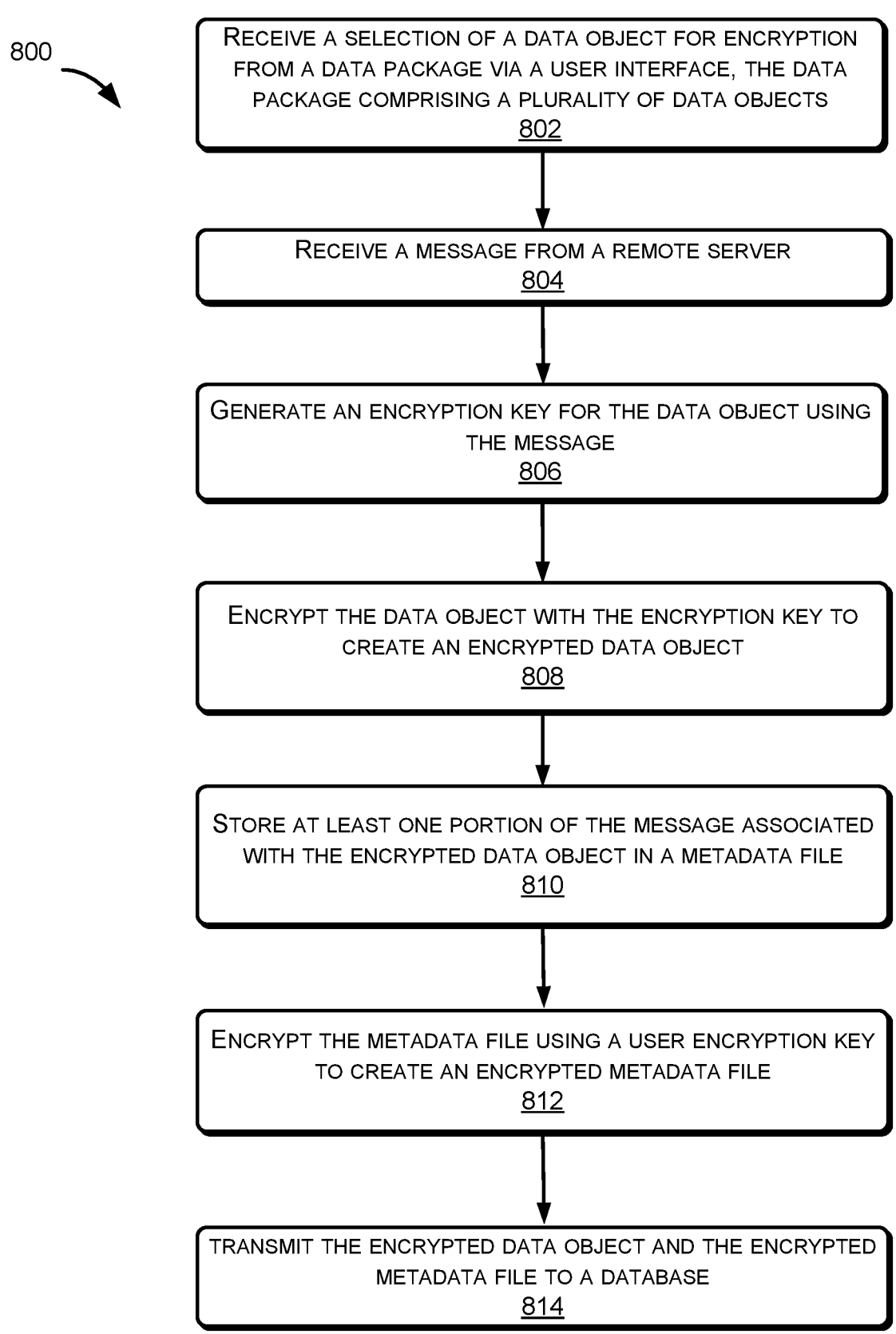
FIG. 8 shows an example method for granular encryption using noncustodial techniques.

Referring now to FIG. 8, FIG. 8 shows an example method 800 for granular encryption using noncustodial techniques. At block 802, a client device 102 receives a selection of a data object 118 for encryption from a data package via a user interface. The data package may have a hierarchical file structure with multiple hierarchical levels as illustrated in FIG. 3. The multiple hierarchical levels comprise a data package level and one or more data object levels. The data package comprises multiple data objects at the one or more data object levels. In some examples, the user selects the data object 118 using a graphical user interface. Alternatively, the web application may automatically select a data object 118 from the data package.

At block 804, the client device 102 receives a message from a remote server 114. The message is a signing request 202, including a secret token 410 associated with the selected data object as illustrated in FIG. 4. The signing request 202 also includes information relating to a signature algorithm. The signature algorithm can be an asymmetric cryptographic algorithm. In some examples, the client device may transmit a request to encrypt multiple data objects and, in response the message or the signing request 202 may include multiple secret tokens 410 based on the number of data objects to be encrypted. For example, if the client device receives a request to encrypt ten data objects, it may send a request to encrypt ten data objects. The remote server 114 may generate ten secret tokens 410 and transmit a single token message 406 that includes all ten secret tokens 410.

At block 806, the client device 102 generates an encryption key for the selected data object using the message. The signature module 106 of client device 102 generates a cryptographic signature 206 using the secret token 410 in the signing request 202 and a user private key 110 with the signature algorithm 204. The signature algorithm can be indicated in the signing algorithm 404 in the signing request 202. The user private key 110 is hosted in the key store 108 of the client device 102. The user private key can be generated using a secret sharing algorithm. The encryption module 122 generates an encryption key 210 using the cryptographic signature 206 with a symmetric encryption algorithm. The symmetric encryption algorithm can be a password-based symmetric encryption algorithm 208. The password-based symmetric encryption algorithm 208 can transform the cryptographic signature 206 into an encryption key.

As discussed above, in some examples the token message 406 may include multiple secret tokens 410. Thus, the client device 102 may generate multiple encryption keys at block 806. Some examples may generate all encryption keys at once before beginning to encrypt any data objects, or the encryption keys may be generated in sequence when a corresponding data object is ready to be encrypted.

At block 808, the client device 102 encrypts the selected data object using the encryption key to create an encrypted data object. The encryption module 122 on the client device 102 encrypts the selected data object using the encryption key. The client device 102 can encrypt multiple data objects in the data package individually in sequence with multiple encryption keys. The multiple encryption keys can be individually generated in sequence using multiple token messages the same way as described in the paragraph above as to block 806. When the data package includes multiple hierarchical levels, the data package is not encrypted at the data package level.

At block 810, the client device 102 stores at least one portion of the message in a metadata file. The at least one portion of the message stored in the metadata file is the secret token 410. In some examples, the client device also stores a description and a URL for the encrypted data object, in addition to the secret token associated with the encrypted data object. It may also store additional information, including an identified signing algorithm 404 or the identified signing method call 408. Further, some examples may store the entirety of the message, which is the signing request 202. When multiple data objects in a data package are encrypted, the metadata file includes multiple secret tokens 410 associated with multiple encrypted data objects and corresponding descriptions and URLs for the encrypted data objects.

At block 812, the client device 102 encrypts the metadata file using a user encryption key. The user encryption key can be a user public key in a key pair with the user private key that is unique to a user associated with the client device 102. That is, only the user possessing the private key can decrypt the encrypted metadata file.

At block 814, the client device 102 transmits the encrypted data object and the encrypted metadata file to a database 130 for storage. The database 130 is at a storage provider 116. Both the encrypted data object and the encrypted metadata file are stored at the storage provider 116. However, the storage provider does not have access to the data in the encrypted data object or the encrypted metadata file because the storage provider cannot decrypt the encrypted data object and the encrypted metadata file without the private key held by the user who owns the data object.

A user may select another data object for encryption and upload, the process is the same as described for FIG. 8. This way, a user can select multiple data objects separately for encryption and upload in sequence. However, it should be appreciated that multiple data objects can be encrypted automatically without manual selection for each data object. For example, a user can select a folder that has multiple data files in multiple sub-folders. The web application then automatically goes through all the sub-folders and requests tokens for each file, automatically encrypts each file individually and creates the metadata file automatically the way similar to FIG. 8.

Referring now to FIG. 9, FIG. 9 shows an example method 900 for decryption of a non-custodially encrypted data object. At block 902, a remote server 114 receives a request for a data object from an exchange platform 132 or other third party. The data object is encrypted with an encryption key and stored in a database 130 at a storage provider 116. The exchange platform 132 in this example is an application ecosystem or a data marketplace platform, but in other examples may be any third party interested in obtaining access to the encrypted data object. One or more applications on the exchange platform or the exchange platform itself can send a request for access to certain data objects belonging to certain users. The request can be a JSON web token. The request includes an identification of the data object. The remote server can then determine the owner of the data object. In some examples, the request may include additional information, such as a party who owns the requested data objects, an identification of the party to whom the request message is sent, an expiration time of the request, and a scope of the requested data object. The request can also include other suitable information, including proposed payment information, license terms, a duration for permitted access, proposed uses of the requested data, or other terms or information At block 904, the remote server 114 sends a notification message to a client device 102 associated with the owner of the data object seeking a response from the client device 102 regarding the request. In this example, the notification message is displayed as a web element, such as a pop-up window or a modal, on the client device 102. However, in some examples, the message may be sent via other transmission mechanisms, such as via a text message, an email, or social media message. Such other transmission mechanisms may identify information associated with the request and may include an option to directly respond via the same transmission mechanism or may include a link to access the web application and approve or deny the request. The notification message may include options for the user to choose regarding the request, such as "allow" or "deny."

At block 906, the remote server receives a response message approving the request from the client device 102. When an authorized user can select "allow" in the notification message displayed on the client device 102, the response message approving the request is generated and sent to the remote server.

At block 908, the remote server 114 causes the database 130 to send an encrypted metadata file to the client device 102 upon receiving the response message. The encrypted metadata file comprises a secret token associated with the encrypted data object. The encrypted metadata file is encrypted with a user public key. Upon receiving the encrypted metadata file from the database 130, client device 102 will decrypt the encrypted metadata file using a user private key paired with the user public key to identify the secret token associated with the requested data object. The client device 102 generates a cryptographic signature using the secret token and the user private key.

In some examples, the client device 102 sends the cryptographic signature to the exchange platform 132. The exchange platform 132 includes a decryption module 134 employing the same password-based symmetric encryption algorithm 208 as in the encryption module 122 in the client device. The decryption module 134 generates a decryption key using the cryptographic signature from the client device. The decryption key is the same as the encryption key used for encrypting the requested data object in the encryption module 122 of the client device 102. In some examples, the client device 102 generates a decryption key using the cryptographic signature with a password-based encryption algorithm and sends the decryption key to the exchange platform 132. The decryption key is the same as the encryption key used for encrypting the requested data object. The exchange platform 132 then decrypts the data object using the decryption key.

In some examples, the client device 102 may send the cryptographic signature to the remote server, which may then forward it to the exchange platform. While this may provide an opportunity for the exchange platform to access the encrypted data object, it may facilitate the transfer in some cases. To help preserve privacy in some examples, the exchange platform may provide its public key to the client device 102, such as in a cryptographically signed message, either directly or via the remote server 114. The client device 102 can then verify the public key's authenticity using the cryptographic signature within the message and then use the public key to encrypt the cryptographic signature needed to decrypt the data object, which can then be sent to the exchange platform either directly or via the remote server 114. Such a technique may allow the decryption information to be sent to the exchange platform without exposing it to another party, such as the remote server 114.

Figure 10:
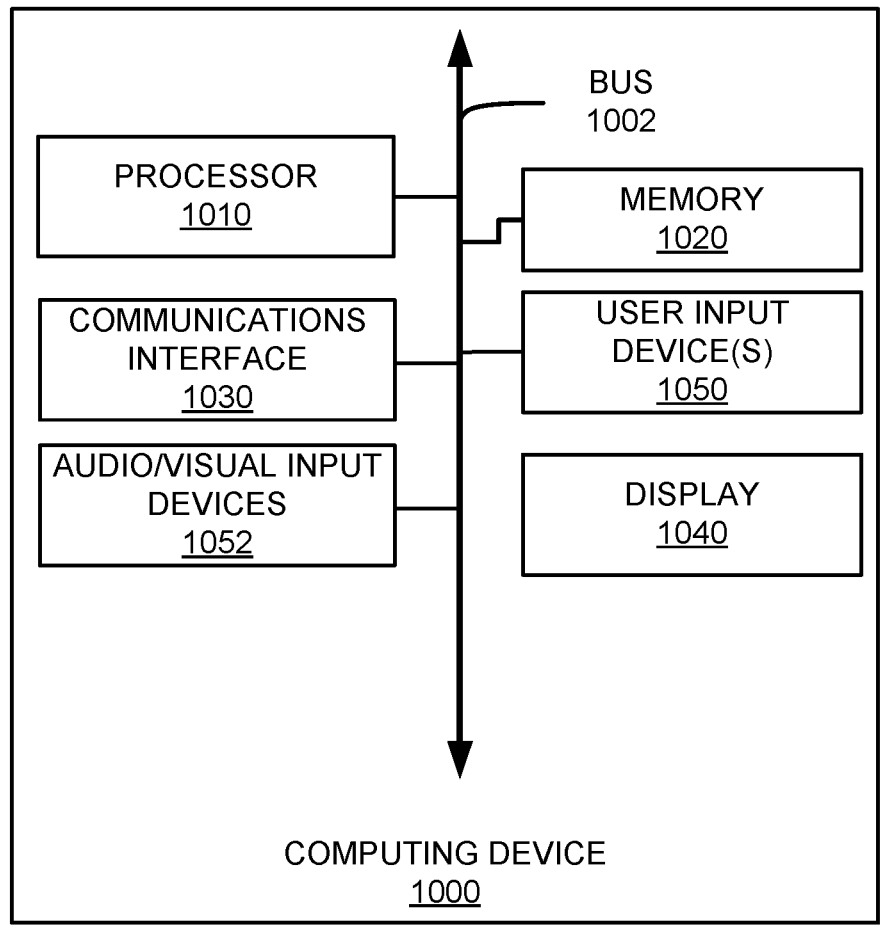
FIG. 10 shows an example computing device suitable for use in example systems or methods employing noncustodial techniques for data encryption and decryption at a granular level in this disclosure.

Referring now to FIG. 10, FIG. 10 shows an example computing device 1000 suitable for use in example systems or methods employing noncustodial techniques for data encryption and decryption at a granular level in this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for employing noncustodial techniques for data encryption according to different examples, such as part or all of the example methods 800 and 900 described above with respect to FIG. 8 and FIG. 9. The computing device 1000, in this example, also includes one or more user input devices 1050, such as a keyboard, mouse, touchscreen, microphone, etc., to accept user input. The computing device 1000 also includes a display 1040 to provide visual output to a user.

The computer device 1000 may also include one or more audio/visual input devices 1052 to enhance a user's ability to give input to or receive input from a multimedia application or feature, such as a video conference, entertainment application, accessibility features, VR headset, or the like.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method, comprising:
  receiving, by a client device, a selection of a data object for encryption from a plurality of data objects in a data package via a user interface;
  transmitting, by the client device, an encryption request to a remote server upon receiving the selection of the data object;
  receiving, by the client device, a token message from the remote server as a response to the encryption request, the token message comprising a secret token associated with the data object and information relating to a signature algorithm;
  generating, by the client device, a cryptographic signature at least based on the secret token and a user private key using the signature algorithm indicated in the token message;
  generating, by the client device, an encryption key for the data object based on the cryptographic signature using a password-based symmetric encryption algorithm;
  encrypting, by the client device, the data object with the encryption key to create an encrypted data object;
  storing, by the client device, at least one portion of the token message associated with the encrypted data object in a metadata file, wherein the at least one portion of the token message stored in the metadata file comprises the secret token associated with the data object and the information relating to the signature algorithm;

encrypting, by the client device, the metadata file using a user encryption key to create an encrypted metadata file; and transmitting, by the client device, the encrypted data object and the encrypted metadata file to a database for storage.

2. The method of claim 1, wherein the signature algorithm is an asymmetric cryptographic algorithm.

3. The method of claim 1, wherein the user private key is generated using a secret sharing algorithm.

4. The method of claim 1, wherein the user encryption key for encrypting the metadata file is a public key paired with the user private key.

5. The method of claim 1, wherein the data package has a hierarchical file structure comprising a plurality of hierarchical levels, wherein the plurality of hierarchical levels comprises a data package level and one or more data object levels, and wherein the data package comprises a plurality of data objects at the one or more data object levels.

6. The method of claim 5, further comprising individually encrypting the plurality of data objects with a plurality of encryption keys, wherein the plurality of encryption keys are generated using a corresponding plurality of tokens received from the remote server, wherein encrypting the plurality of data objects does not comprise encrypting at the data package level.

7. The method of claim 1, wherein the metadata file further comprises a description for the encrypted data object.

8. The method of claim 1, wherein the metadata file is a JavaScript Object Notation (JSON) file.

9. A client device, comprising:
a communications interface;
a non-transitory computer-readable medium; and
a processor communicatively coupled to the communications interface and the non-transitory computer-readable medium, the processor configured to execute processor-executable instructions stored in the non-transitory computer-readable medium to:

receive a selection of a data object for encryption from a plurality of data objects in a data package via a user interface;

transmit an encryption request to a remote server upon receiving the selection of the data object;

receive a token message from the remote server as a response to the encryption request, the token message comprising a secret token associated with the data object and information relating to a signature algorithm;

generate a cryptographic signature at least based on the secret token and a user private key using the signature algorithm indicated in the token message;

generate an encryption key for the selected data object based on the cryptographic signature using a password-based symmetric encryption algorithm;

encrypt the data object with the encryption key to create an encrypted data object;

store at least one portion of the token message associated with the encrypted data object in a metadata file, wherein the at least one portion of the token message stored in the metadata file comprises the secret token associated with the data object and the information relating to the signature algorithm;

encrypt the metadata file using a user public key to create an encrypted metadata file; and transmit the encrypted data object and the encrypted metadata file to a database for storage.

10. The client device of claim 9, wherein the data package has a hierarchical file structure comprising a plurality of hierarchical levels, wherein the plurality of hierarchical levels comprises a data package level and one or more data object levels, and wherein the data package comprises a plurality of data objects at the one or more data object levels.

11. The client device of claim 10, wherein the processor is further configured to execute processor-executable instructions stored in the non-transitory computer-readable medium to individually encrypt the plurality of data objects with a plurality of encryption keys, wherein the plurality of encryption keys are corresponding to a plurality of secret tokens, and wherein encrypting the plurality of data objects does not comprise encrypting at the data package level.

* * * * *